UNITED STATES PATENT OFFICE.

ALBERT LEACH, OF LYNN, MASSACHUSETTS.

IMPROVED CEMENT FOR LEATHER.

Specification forming part of Letters Patent No. 59,774, dated November 20, 1866.

*To all whom it may concern:*

Be it known that I, ALBERT LEACH, of Lynn, of the county of Essex and State of Massachusetts, have made a new and useful Composition for Connecting Leather; and I do hereby declare the constituents thereof and the mode of combining them to be fully described as follows:

For making the said composition I take, for instance, two gallons of benzine, one pound of caoutchouc or india-rubber, one quarter of a pound of ivory-black, and one ounce of sulphuric acid.

I do not, however, confine my invention to the above-mentioned proportions of its constituents, as they may be somewhat varied without material variation of the result.

In preparing the composition, I first dissolve the caoutchouc in the benzine. I also mix together the ivory-black and the sulphuric acid, and afterward incorporate the mixture with the solution of elastic gum, taking care to perform the same in such way that the mixture of acid and ivory-black may be uniformly diffused throughout the solution.

I have found, from experience, that different kinds of the elastic gum, when mixed together, are productive of a better cement than any one kind will make, as, for instance, the caoutchoucs from Brazil and Central America, when mixed together in the proportions of one to five in weight—that is, one part of the Brazil gum to four parts of that from Central America—may be employed to advantage.

I make use of the benzine to dissolve the caoutchouc, the former being readily vaporizable. The ivory-black is to give body and drying qualities to the solution.

The acid is for refining the ivory-black, or destroying all gritty and oily matter therein. It also has other useful effects, particularly in respect to the drying and hardening of the cement.

The above composition is found to be very valuable and useful in the shoe manufacture, particularly for cementing or fastening down the lips of shoe-channels.

I claim as my invention—

The composition made of the materials and in the manner substantially as hereinbefore specified.

ALBERT LEACH.

Witnesses:
R. H. EDDY,
F. P. HALE, Jr.